(12) United States Patent
Tighe et al.

(10) Patent No.: US 8,551,664 B2
(45) Date of Patent: Oct. 8, 2013

(54) FUEL CELL HUMIDIFIER DIAGNOSTIC

(75) Inventors: Thomas W. Tighe, Bloomfield, NY (US); Robert L. Fuss, Spencerport, NY (US); Robert N. Carter, Honeoye Falls, NY (US); Bruce J. Clingerman, North Rose, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1211 days.

(21) Appl. No.: 11/842,379

(22) Filed: Aug. 21, 2007

(65) Prior Publication Data

US 2008/0014478 A1    Jan. 17, 2008

Related U.S. Application Data

(63) Continuation-in-part of application No. 10/827,699, filed on Apr. 20, 2004, now abandoned.

(51) Int. Cl.
*H01M 8/06* (2006.01)
*H01M 8/00* (2006.01)

(52) U.S. Cl.
USPC ............ 429/413; 429/400; 429/408; 429/427

(58) Field of Classification Search
USPC ................... 429/400, 408–413, 427
See application file for complete search history.

(56) References Cited

U.S. PATENT DOCUMENTS

| 6,461,751 | B1 * | 10/2002 | Boehm et al. | 429/432 |
| 6,681,752 | B1 * | 1/2004 | Kreikemeier et al. | 123/683 |
| 7,087,326 | B2 * | 8/2006 | Imamura et al. | 429/431 |
| 2001/0046616 | A1 * | 11/2001 | Mossman | 429/13 |
| 2004/0234829 | A1 * | 11/2004 | Sederquist et al. | 429/26 |
| 2007/0111058 | A1 * | 5/2007 | Yoshida | 429/22 |

FOREIGN PATENT DOCUMENTS

DE    10 2004 025 229 A1    12/2005

* cited by examiner

*Primary Examiner* — Karie O'Neill Apicella
(74) *Attorney, Agent, or Firm* — Fraser Clemens Martin & Miller LLC; J. Douglas Miller

(57) ABSTRACT

A fuel cell system is disclosed that employs a humidifier and an oxygen sensor for measuring the oxygen concentration in the cathode exhaust gas from the fuel cell stack to determine a system diagnostic, such as a fluid leak from or across the humidifier.

18 Claims, 3 Drawing Sheets

FUEL CELL HUMIDIFIER DIAGNOSTIC

CROSS-REFERENCE TO RELATED APPLICATION

This application is a continuation-in-part of U.S. patent application Ser. No. 10/827,699 filed on Apr. 20, 2004 now abandoned, hereby incorporated herein by reference in its entirety.

FIELD OF THE INVENTION

This invention relates to a fuel cell system and, more particularly, to a fuel cell system that employs an oxygen sensor for measuring the oxygen in a cathode exhaust to facilitate cathode stoichiometry control.

BACKGROUND OF THE INVENTION

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perflurosulfonic acid membrane. The anode and cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. The fuel cell stack receives a cathode input gas as a flow of air, typically forced through the stack by a compressor. Not all of the oxygen in the air is consumed by the stack, and some of the air is output as a cathode exhaust gas that may include water as a stack by-product.

The fuel cell stack needs to put out a certain amount of power to provide the desired work. The fuel cell stack power is determined by the amount of oxygen applied to the cathode relative to the amount of hydrogen applied to the anode. The amount of oxygen required to achieve a certain stack output power is referred to as cathode air stoichiometry or cathode lambda. Particularly, the cathode lambda is the amount of oxygen delivered to the stack, divided by the amount of oxygen that is consumed by the stack. Some fuel cell systems operate at a constant cathode lambda across the entire power output of the system. Other fuel cell systems operate at different cathode lambdas for different power outputs.

Some fuel cell systems incorporate a humidifier to humidify the air caused to flow to the cathode. If the humidifier contains a leak, the leak causes a loss of control of the stoichiometry in the air flowing to the cathode. It is undesirable for the fuel cell stack to be operated with an air flow having an incorrect cathode stoichiometry.

It is known in the art to employ an air flow meter that measures the air flow applied to the compressor to determine the amount of oxygen that is being applied to the stack. It is also known to employ an amp meter to measure the current output of the stack. The combination of the oxygen applied to the stack and the current output of the stack can be used to determine the cathode lambda at which the system is operating. A controller operates the compressor at the desired speed to achieve the proper cathode lambda.

It would be desirable to provide a fuel cell system including an oxygen sensor and a humidifier, wherein the fuel cell system is adapted to provide a sensor signal indicative of an oxygen concentration in the air flow exiting the fuel cell stack to determine if a leak exists in the fuel cell system.

SUMMARY OF THE INVENTION

Concordant and congruous with the present invention, a fuel cell system including an oxygen sensor in fluid communication with a humidifier and adapted to provide a sensor signal indicative of an oxygen concentration in the air flow exiting the fuel cell stack to determine if a leak exists in the fuel cell system, has surprisingly been discovered.

In one embodiment, the fuel cell system comprises a fuel cell stack including at least a cathode inlet and at least a cathode outlet, wherein a fluid comprising oxygen is caused to flow through the inlet and the outlet of said fuel cell stack; a humidifier in fluid communication with the cathode inlet of said fuel cell stack adapted to humidify the fluid; an oxygen sensor in fluid communication with the cathode outlet of said fuel cell stack and said humidifier, said oxygen sensor adapted to generate a sensor signal indicative of a concentration of the oxygen in the fluid exiting said fuel cell stack, wherein the sensor signal is used to determine a system diagnostic.

In another embodiment, the fuel cell system comprises a fuel cell stack including at least a cathode inlet and at least a cathode outlet, wherein a fluid comprising oxygen is caused to flow through the inlet and the outlet of said fuel cell stack; a humidifier in fluid communication with the cathode inlet of said fuel cell stack and adapted to humidify the fluid; an oxygen sensor in fluid communication with the cathode outlet of said fuel cell stack and an inlet to a dry side of said humidifier, said oxygen sensor adapted to generate a sensor signal indicative of the oxygen concentration in the fluid exiting said fuel cell stack, wherein the sensor signal is used to determine a system diagnostic; and a controller, said controller responsive to the sensor signal from said oxygen sensor and adapted to cause a change in the flow of the fluid to the cathode inlet to provide a desired stoichiometry.

In another embodiment, the method of controlling a fuel cell system leak comprises the steps of providing a fuel cell stack including at least a cathode inlet and a cathode outlet; providing a humidifier in fluid communication with the fuel cell stack; providing an oxygen sensor in fluid communication with the cathode outlet of the fuel cell stack and the humidifier, the sensor adapted to provide a sensor signal; providing a controller adapted to determine a system diagnostic; causing a fluid comprising oxygen to flow through the fuel cell system, wherein the sensor signal is indicative of the oxygen concentration in the fluid exiting the fuel cell stack and is used to determine the system diagnostic; and changing the flow of the fluid through the fuel cell system with the controller based on the system diagnostic to provide a desired stoichiometry at the inlet of the fuel cell stack.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
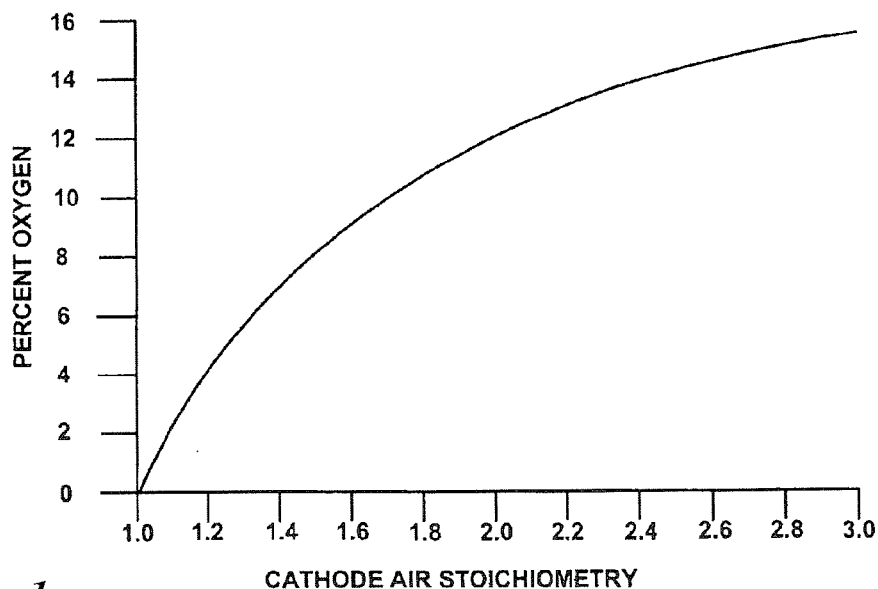
FIG. 1 is a graph with cathode air stoichiometry on the horizontal axis and percent oxygen in the cathode exhaust on the vertical axis that shows the relationship between the concentration of oxygen in the cathode exhaust gas of a fuel cell stack to the cathode oxygen stoichiometry.

FIG. 1 is a graph with cathode oxygen stoichiometry (cathode lambda) on the horizontal axis and percent oxygen in the cathode exhaust on the vertical axis showing the relationship between the concentration of oxygen in the cathode exhaust gas of a fuel cell stack to its cathode lambda. As will be discussed in detail below, this relationship can be used to determine whether the proper amount of cathode input air is being applied to a fuel cell stack based on a measure of the percent of oxygen in the cathode exhaust gas.

Figure 2:
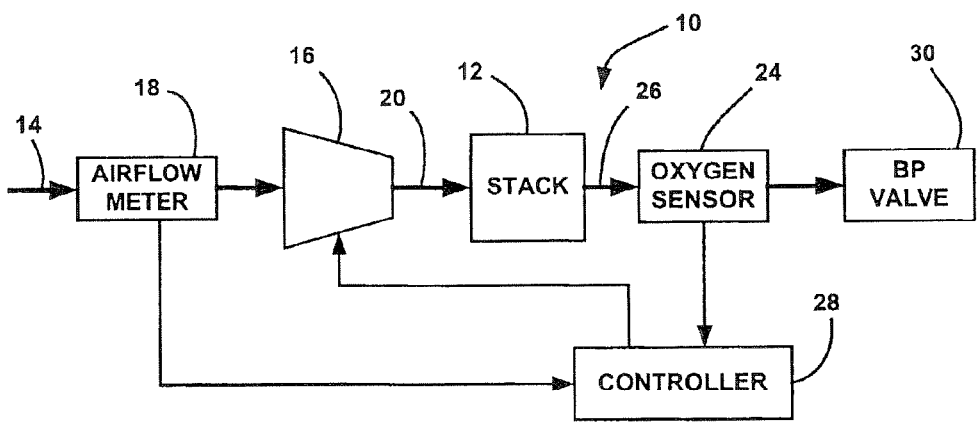
FIG. 2 is a block diagram of a fuel cell system employing an oxygen sensor for determining cathode stoichiometry, according to an embodiment of the present invention.

FIG. 2 is a block diagram of a fuel cell system 10, according to an embodiment of the present invention. The fuel cell system 10 includes a fuel cell stack 12 having a stack of fuel cells, as discussed above. The fuel cell stack 12 receives a cathode air input and an anode hydrogen input that electrochemically interact to generate output power to drive a vehicle or some other system. An air input line 14 is applied to a compressor 16, or other air delivery device, that compresses the air and delivers the compressed air on line 20 to the cathode input of the stack 12. The anode input of the stack 12 is not shown because it does not form part of the present invention. The system 10 includes an airflow meter 18 that measures the airflow mass applied to the compressor 16 as is known in certain fuel cell systems in the art. As discussed above, the airflow meter 18 has been used in the industry to determine the cathode lambda of the stack 12. However, as will become apparent from the discussion below, the airflow meter 18 is not necessary in the present invention to perform this function.

According to the invention, the system 10 employs an oxygen sensor 24 through which flows cathode exhaust gas from the stack 12 on line 26. The oxygen sensor 24 can be any oxygen sensor suitable for the purposes discussed herein, such as an automotive exhaust oxygen sensor. The oxygen sensor 24 provides a signal indicative of the concentration of the oxygen in the cathode exhaust gas to a controller 28. By knowing the concentration of oxygen in the cathode exhaust gas, the controller 28 can determine the cathode lambda of the stack 12 based on the relationship shown in FIG. 1. The controller 28 provides a control signal to the compressor 16 to drive the compressor 16 at the appropriate speed so that the concentration of oxygen measured by the oxygen sensor 24 in the cathode exhaust gas provides the desired cathode lambda for the system 10. Therefore, the oxygen sensor 24 can replace the airflow meter 18 to determine the cathode lambda of the stack 12.

A back pressure valve 30 is provided in the cathode exhaust gas line 26 to control the operational pressure of the cathode exhaust gas to maintain the proper relative humidity and cell voltages within within the stack 12, as is understood in the art. The oxygen sensor 24 is shown upstream from the back pressure valve 30. However, in other embodiments the oxygen sensor 24 can be positioned downstream from the back pressure valve 30.

According to another embodiment of the present invention, the airflow meter 18 and the oxygen sensor 24 are used in combination for diagnostic purposes for the system 10. Typically, the airflow meter 18 is mounted at the input of the compressor 16 because the output gas of the compressor 16 is too hot for the airflow meter 18. Thus, the airflow meter 18 would not be able to determine whether an air leak exists downstream from the airflow meter 18. If a leak does exist upstream of the stack 12, the controller 28 would not detect it, and therefore the system 10 would not be getting the proper amount of oxygen because the airflow meter 18 is positioned upstream from the leak.

By employing the oxygen sensor 24, as discussed above, the controller 28 would drive the compressor 16 at the proper speed to overcome the leak because it would provide the additional oxygen necessary to provide the desired cathode lambda. By employing the airflow meter 18 in combination with the oxygen sensor 24, the controller 28 will know that the proper airflow is being provided to the compressor 16 to provide the desired cathode lambda, but the oxygen sensor 24 would indicate that the proper cathode lambda is not being achieved at the predicted airflow. This would indicate a problem within the system 10, such as a leak in the lines 20 or 26 or the stack 12.

Alternatively, the controller 28 can use a compressor map of the compressor 16 based on compressor speed and the compressor input/output pressure ratio to calculate the appropriate cathode lambda, and compare that calculation to the output from the oxygen sensor 24. Because the controller 28 will know the $\Delta P$ (delta pressure) across the compressor 16, the controller 28 will then be able to determine if an air leak exists for diagnostic purposes. If a much higher cathode lambda is expected, a system diagnostic warning is given indicative of a degrading compressor performance or an air leak somewhere in the system 10. The closed loop nature of the feedback can compensate for the problem until the system 10 is serviced.

Additionally, the oxygen sensor 24 can be used as a control for the airflow meter 18. It is known in the art that airflow meters used for this purpose tend to drift over time. Therefore, the oxygen sensor 24 can be used to determine the accuracy of the airflow meter 18, and compensate for its operation over time.

It is known in the art to employ a test stand in a laboratory environment to test the performance of a fuel cell stack during stack design and the like. According to the invention, an oxygen sensor can also be employed in the test stand system for measuring the oxygen concentration in the cathode exhaust to determine cathode stoichiometry.

Figure 3:
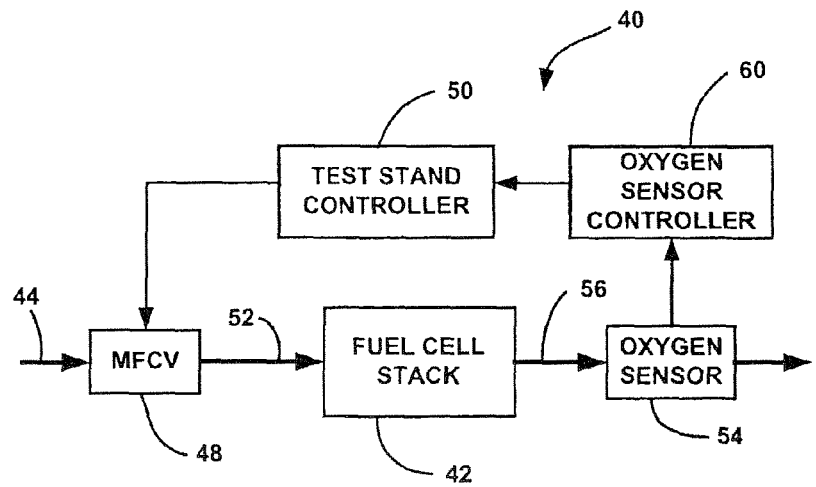
FIG. 3 is a block diagram of a fuel cell system employing a mass flow control valve in the cathode input to the fuel cell stack and an oxygen sensor in the cathode exhaust of the fuel cell stack to control cathode stoichiometry, according to another embodiment of the present invention.

FIG. 3 is a block diagram of a fuel cell system 40 that is being tested in a test stand environment, according to another embodiment of the present invention. The fuel cell system 40 includes a fuel cell stack 42 having a stack of fuel cells, as discussed above. The fuel cell stack 42 receives a cathode air input and an anode hydrogen input that electrochemically interact to generate output power to drive a vehicle or some other system. Cathode charge air on an air input line 44 is sent to a mass flow control valve (MFCV) 48 that is controlled by a test stand controller 50 to provide the proper amount of charge air on a cathode input line 52 to the fuel cell stack 42. The anode input of the fuel cell stack 42 is not shown because it does not form part of the present invention. By controlling the valve position of the MFCV 48, the proper cathode stoichiometry is provided to the fuel cell stack 42 for the desired output power at any given point in time.

According to the invention, the system 40 employs an oxygen sensor 54 through which flows cathode exhaust gas from the stack 42 on a cathode exhaust line 56. The oxygen sensor 54 can be any oxygen sensor suitable for the purposes discussed herein, such as the known automotive exhaust oxygen sensor. The oxygen sensor 54 provides a signal indicative of the concentration of the oxygen in the cathode exhaust gas to an oxygen sensor controller 60. The oxygen sensor controller 60 is actually part of the oxygen sensor 54, and includes the electronics of the sensor 54 that are removed from the harsh environment of the cathode exhaust. The oxygen sensor controller 60 conditions the signal from the sensor 54 and provides a signal to the test stand controller 50 indicative of the amount of oxygen in the cathode exhaust gas. The test stand controller 50 will determine if the fuel cell stack 42 is receiving the proper amount of charge air based on a stoichiometric calculation. If the MFCV 48 is not supplying the proper concentration of charge gas to the cathode, the test stand controller 50 will control the valve position of the MFCV 48 accordingly so that the amount of oxygen in the cathode exhaust line is representative of the proper charge air stoichiometry applied to the fuel cell stack 42.

Figure 4:
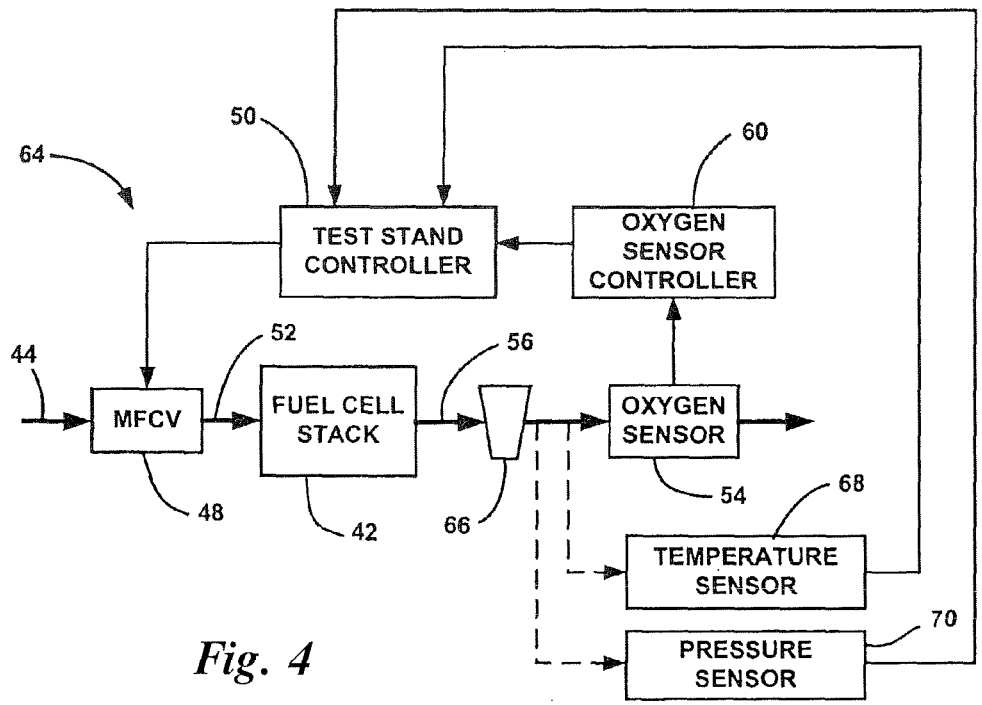
FIG. 4 is a block diagram of a fuel cell system employing a mass flow control valve in the cathode input to the fuel cell stack and an oxygen sensor, a temperature sensor, a pressure sensor and a water vapor separator in the cathode exhaust of the fuel cell stack for controlling cathode stoichiometry, according to another embodiment of the present invention.

In the system 40, the relative humidity (RH) at the point of analysis is assumed. This assumption may or may not be accurate. It is possible that water vapor in the cathode exhaust will significantly impact the partial pressure of oxygen in the exhaust gas. Therefore, to accurately assess the actual oxygen content in the cathode exhaust, the RH of the exhaust gas should be determined. FIG. 4 is a block diagram of a fuel cell system 64, according to another embodiment of the present invention, that corrects for the exhaust gas relative humidity, where like elements are identified by the same reference numeral. In this embodiment, the cathode exhaust is sent through a water vapor separator 66 before being sent to the oxygen sensor 54 to remove the liquid water therefrom. However, the exhaust gas will be saturated with water vapor at the temperature and pressure at which it exits the water separator 66.

A temperature sensor 68 measures the temperature of the cathode exhaust gas between the water separator 66 and the oxygen sensor 54, and provides a signal indicative of the temperature to the test stand controller 50. Likewise, a pressure sensor 70 measures the pressure of the cathode exhaust gas between the water vapor separator 66 and the oxygen sensor 54, and provides a signal of the pressure to the test stand controller 50. The temperature sensor 68 can be any temperature sensor suitable for the purposes discussed herein, such as a thermocouple. Likewise, the pressure sensor 70 can be any pressure sensor suitable for the purposes discussed herein, such as a pressure transducer. The test stand controller 50 uses these measurements to calculate the water content of the exhaust gas and correct the impact it has on the partial pressure of oxygen. By determining the temperature and pressure of the cathode exhaust gas, the test stand controller 50 can determine the RH or water content of the exhaust gas to provide a proper measurement of the cathode stoichiometry.

Figure 5:
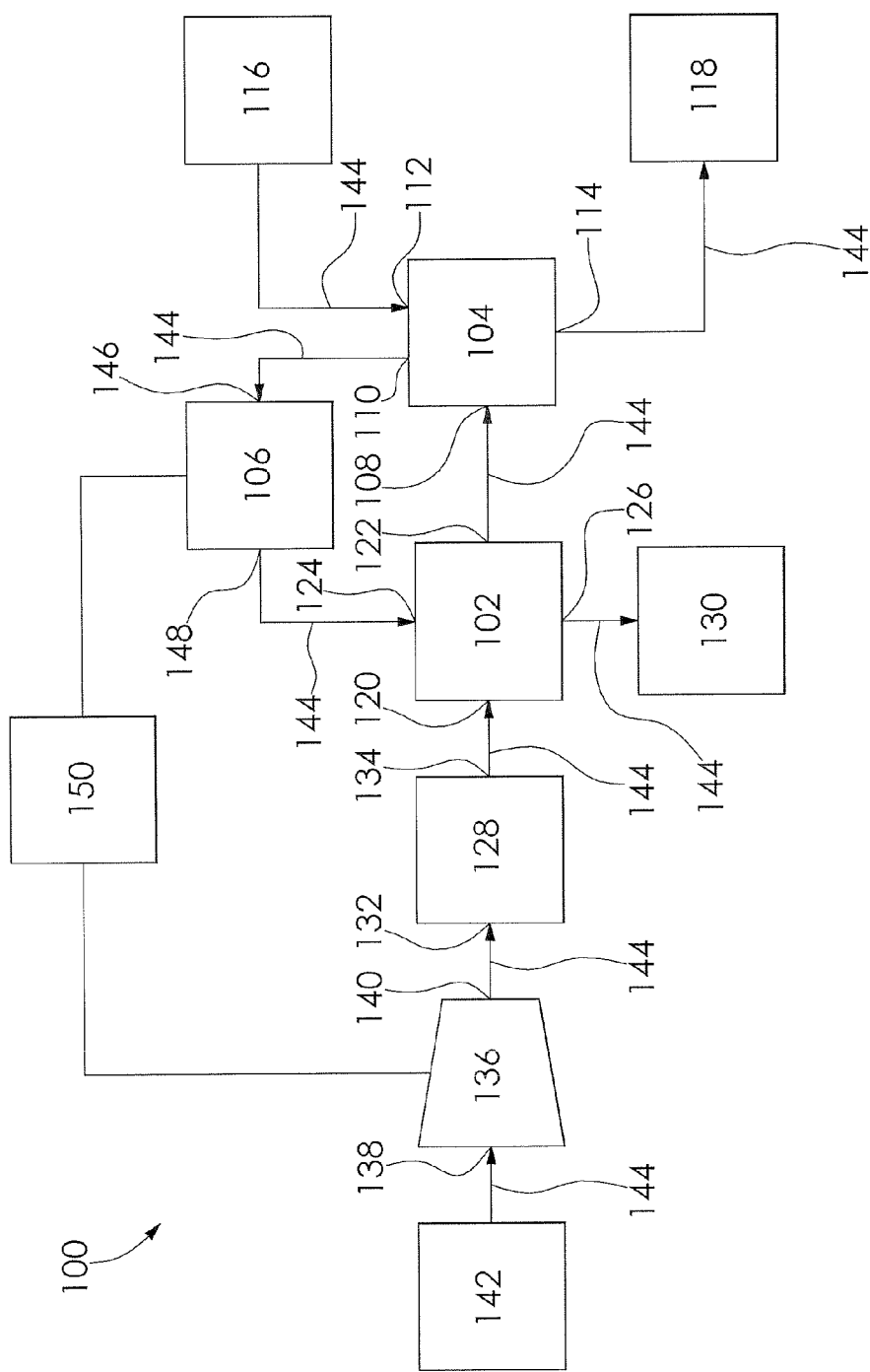
FIG. 5 is a block diagram of a fuel cell system including an oxygen sensor in fluid communication with a humidifier, according to another embodiment of the present invention.

FIG. 5 shows a fuel cell system 100 according to another embodiment of the present invention. The fuel cell system 100 includes a humidifier 102 in fluid communication with a fuel cell stack 104 and an oxygen sensor 106.

In the embodiment shown in FIG. 5, the humidifier 102 is a water vapor transfer unit adapted to humidify an oxidant such as air prior to entering into the fuel cell stack 104. The water vapor transfer unit includes a dry side and a wet side separated by a water vapor permeable membrane (not shown) or the like. The dry side has a first inlet 120 and a first outlet 122, and the wet side has a second inlet 124 and a second outlet 126. The first inlet 120 is in fluid communication with a heat exchanger 128. The first outlet 122 is in fluid communication with the cathode inlet 108 of the fuel cell stack 104. The second inlet 124 is in fluid communication with the oxygen sensor 106, and the second outlet 126 is in fluid communication with the atmosphere 130. The heat exchanger 128 includes an inlet 132 and an outlet 134. The inlet 132 is in fluid communication with a compressor 136, and the outlet 134 is in fluid communication with the first inlet 120 of the humidifier 102. In the embodiment shown, the heat exchanger 128 is a low-temperature core. It is understood that any conventional heat exchanger may be used such as a shell and tube heat exchanger, a plate heat exchanger, an air-cooled heat exchanger, or other heat exchanger known in the art. The compressor 136 includes an inlet 138 and an outlet 140. The inlet 138 of the compressor 136 is in fluid communication with an oxygen source 142, and the outlet 140 of the compressor 136 is in fluid communication with the inlet 132 of the heat exchanger 128. The oxygen source 142 is typically a source of air. It is understood that the oxygen source 142 may be a fuel tank or the atmosphere, for example, as desired. In the embodiment shown, the compressor 136 is a centrifugal air compressor. The compressor 136 may be any conventional means for compressing a fluid such as a turbomachine, a centrifugal compressor, a mixed flow compressor, a blower or a fan, for example.

The fuel cell stack 104 includes a stack of cathodes, anodes, and membranes (fuel cells), as previously discussed herein. It is understood that the number of fuel cells in the fuel cell stack 104 may vary. Each fuel cell of the fuel cell stack 104 has a pair of MEAs (not shown) separated by an electrically conductive bipolar plate (not shown). The MEAs and bipolar plates are stacked together between stainless steel clamping plates or end plates (not shown) and end contact elements (not shown). The end contact elements and bipolar plates contain a plurality of grooves or channels for distributing fuel and oxidant gases (i.e. hydrogen and oxygen) to the MEAs.

The fuel cell stack 104 includes the cathode inlet 108, a cathode outlet 110, an anode inlet 112, and an anode outlet 114. The cathode inlet 108 is in fluid communication with the humidifier 102. The cathode outlet 110 is in fluid communication with the oxygen sensor 106. The anode inlet 112 is in fluid communication with a hydrogen source 116. The anode outlet 114 is in fluid communication with an exhaust system 118. The number of inlets and outlets in the fuel cell stack 104 may vary based on the size of the stack in use, amount of outlet energy required from the stack, and other design considerations. It is understood that the hydrogen source 116 may be a fuel tank or other system component, for example, as desired. It is also understood that the anode outlet 114 may be in fluid communication with the atmosphere, another fuel cell stack (not shown), or other system component, as desired.

In the embodiment shown, the oxygen sensor 106 is a wide band oxygen sensor such as a universal exhaust gas oxygen (UEGO) sensor, for example. The oxygen sensor 106 includes an inlet 146 and an outlet 148. The inlet 146 is in fluid communication with the cathode outlet 110 of the fuel cell stack 104. The outlet 148 is in fluid communication with the second inlet 124 of the humidifier 102. The oxygen sensor 106 is adapted to provide a sensor signal indicative of the concentration of the oxygen in the fluid stream exiting the cathode outlet 110 of the fuel cell stack 104. It is understood that the oxygen sensor 106 may be any conventional gas sensor such as an automotive exhaust oxygen sensor, for example.

In use, the air comprising oxygen is caused to flow from the oxygen source 142 and through the fuel cell system 100. The air is caused to flow through conduit 144 to the inlet 138 of the compressor 136. In the compressor 136, the volume of the air is reduced thereby increasing the pressure and the temperature. The air is then caused to flow through the conduit 144 to the inlet 132 of the heat exchanger 128. In the heat exchanger 128, the air is cooled to a desired temperature. Air from the outlet 134 of the heat exchanger 128 flows through the conduit 144 to the first inlet 120 of the humidifier 102 and through the dry side of the humidifier 102. In the humidifier 102, air having a higher moisture content than the air flowing through the dry side is caused to flow through the wet side and transfers moisture through the membrane to the air flowing through the dry side. The air in the wet side is caused to flow through the second outlet 126 of the humidifier 102 and to the atmosphere 130. The air in the dry side is caused to flow through the first outlet 122 to the cathode inlet 108 of the fuel cell stack 104.

Simultaneous to the air being caused to flow to the stack 104, hydrogen gas is caused to flow from the hydrogen source 116 to the anode inlet 112 of the fuel cell stack 104. In the fuel cell stack 104, the oxygen in the air electrochemically reacts with the hydrogen to generate power to drive a vehicle or other system as is known in the art. Unreacted hydrogen is caused to flow out of the fuel cell stack 104, through the anode outlet 114, and through the conduit 144 to the exhaust system 118. Unreacted oxygen is caused to flow through the cathode outlet 110, through the conduit 144, to the inlet 146 of the oxygen sensor 106. It is understood that the oxygen sensor 106 may be separate from the fuel cell system 100, and a portion of the flow of oxygen may be caused to flow from the fuel cell system 100 to the oxygen sensor 106.

While the air is in the oxygen sensor 106, the oxygen sensor 106 provides the sensor signal indicative of the concentration of the oxygen in the air flow. The sensor signal is sent to a controller 150 in communication with the oxygen sensor 106 where the cathode stoichiometry of the fuel cell stack 104 is determined based on the relationship shown in FIG. 1. Based on the cathode stoichiometry and a known amount of oxygen supplied from the oxygen source 142 to the fuel cell system 100, a leak from the dry side of the humidifier 102 to the wet side of the humidifier 102 can be detected by comparing the known amount of oxygen supplied to the fuel cell system 100 to the cathode stoichiometry determined by the sensor signal to the controller 150. A leak from the cathode of the fuel cell stack 104 may also be detected. By detecting cathode stoichimetric imbalances, the fuel cell system 100 may be adjusted to militate against undesirable operating conditions therein, and improve the performance thereof, until the repairs can be made.

Alternatively, the controller 150 may provide a control signal to the compressor 136 to operate at a desired speed until the concentration of oxygen in the air flow measured by the oxygen sensor 106 reaches the desired cathode stoichiometry for the fuel cell system 100. The controller 150 may also provide a control signal to increase a flow of oxygen through the fuel cell system 100, or the controller 150 may reduce the current load drawn by the fuel cell system 100 or vehicle, as desired. Additionally, the controller 150 may utilize a compressor map based on a speed and pressure ratio to calculate the appropriate cathode stoichiometry, and compare that calculation to the outlet of fluid flow from the oxygen sensor 106. Because the controller 150 has detected the $\Delta P$ (delta pressure) across the compressor 136, the controller 150 can determine if an air leak exists for diagnostic purposes. If a much higher cathode lambda is expected, a sensor signal warning is generated for degrading performance of the compressor 136 or an air leak somewhere in the fuel cell system 100. The closed loop nature of the feedback can compensate for the problem until the fuel cell system 100 is serviced. The air in the oxygen sensor 106 is then caused to flow through the outlet 148, through the conduit 144, through the second inlet 124 to the wet side of the humidifier 102, through the second outlet 126 of the humidifier 102, and to the atmosphere 130.

Further, during a shut-down operation of the fuel cell system 100, oxygen in the fuel cell stack 104 reacts as described above leaving a blanket of nitrogen on the cathode side of the fuel cell stack 104. While the fuel cell system 100 is shut down, unreacted oxygen in the fuel cell stack 104 may diffuse to the cathode side of the fuel cell stack 104, thereby causing degredation to system components. The oxygen sensor 106 may provide a sensor signal indicative of the concentration of the oxygen in the headers of the fuel cell stack 104 after a shut-down operation of the fuel cell system 100. The sensor signal may be used to determine if the cathode side of the fuel cell stack 104 is properly sealed from oxygen diffusion, thereby protecting the system components and extending a useful life of the fuel cell system 100.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack including at least a cathode inlet and at least a cathode outlet, wherein a fluid comprising oxygen is caused to flow through the inlet and the outlet of said fuel cell stack;
a humidifier having a dry side with an outlet and a wet side with an inlet adapted to humidify the fluid, the outlet of the dry side of said humidifier in fluid communication with the cathode inlet of said fuel cell stack;
an oxygen sensor in fluid communication with the cathode outlet of said fuel cell stack and the inlet of the wet side of said humidifier, said oxygen sensor adapted to generate a sensor signal indicative of a concentration of the oxygen in the fluid exiting said fuel cell stack, wherein the sensor signal is used to determine whether a leak of the fluid exists from the dry side of said humidifier to the wet side of said humidifier.

2. The fuel cell system of claim 1, further comprising a controller, said controller responsive to the sensor signal from said oxygen sensor and adapted to cause a change in the flow of the fluid to the cathode inlet to maintain a desired stoichiometry.

3. The fuel cell system of claim 2, wherein the sensor signal is used to effect a change in the flow of the fluid to said fuel cell stack.

4. The fuel cell system of claim 1, wherein the system diagnostic determined is whether a leak of the fluid exists in said fuel cell stack.

5. The fuel cell system of claim 1, further comprising a compressor in communication with said humidifier, wherein said compressor is adapted to provide a flow of the fluid to maintain a desired stoichiometry at the inlet of said fuel cell stack.

6. The fuel cell system of claim 5, further comprising a heat exchanger disposed between and in fluid communication with said compressor and said humidifier.

7. The fuel cell system of claim 1, wherein said humidifier is a water vapor transfer unit.

8. The fuel cell system of claim 1, wherein said oxygen sensor is a wide band oxygen sensor.

9. A fuel cell system comprising:
a fuel cell stack including at least a cathode inlet and at least a cathode outlet, wherein a fluid comprising oxygen is caused to flow through the inlet and the outlet of said fuel cell stack;
a humidifier having a dry side with an outlet and a wet side with an inlet adapted to humidify the fluid, the outlet of the dry side of said humidifier in fluid communication with the cathode inlet of said fuel cell stack;
an oxygen sensor in fluid communication with the cathode outlet of said fuel cell stack and the inlet of the wet side of said humidifier, said oxygen sensor adapted to generate a sensor signal indicative of a concentration of the oxygen in the fluid exiting said fuel cell stack, wherein the sensor signal is used to determine a system diagnostic; and
a controller, said controller responsive to the sensor signal from said oxygen sensor and adapted to cause a change in the flow of the fluid to the cathode inlet to provide a desired stoichiometry.

10. The fuel cell system of claim 9, wherein the system diagnostic determined is whether a leak of the fluid exists from the dry side of said humidifier to the wet side of said humidifier.

11. The fuel cell system of claim 9, wherein the system diagnostic determined is whether a leak of the fluid exists in said fuel cell stack.

12. The fuel cell system of claim 9, further comprising a compressor in communication with said humidifier, wherein said compressor is adapted to provide a flow of the fluid to said humidifier to maintain a desired stoichiometry at the inlet of said fuel cell stack.

13. The fuel cell system of claim 12, further comprising a heat exchanger disposed between and in fluid communication with said compressor and said humidifier.

14. The fuel cell system of claim 9, wherein said humidifier is a water vapor transfer unit.

15. The fuel cell system of claim 9, wherein said oxygen sensor is a wide band oxygen sensor.

16. The fuel cell system of claim 9, wherein the signal sensor causes a change in the flow of the fluid to said fuel cell stack.

17. A fuel cell system comprising:
a fuel cell stack including at least a cathode inlet and at least a cathode outlet, wherein a fluid comprising oxygen is caused to flow through the inlet and the outlet of said fuel cell stack;
a humidifier a humidifier having a dry side with an outlet and an inlet and a wet side with an inlet adapted to humidify the fluid, the outlet of the dry side of said humidifier in fluid communication with the cathode inlet of said fuel cell stack;
a compressor in fluid communication with the inlet of the dry side of said humidifier, wherein said compressor to provide a flow of the fluid to maintain a desired stoichiometry at the inlet of said fuel cell stack; and
an oxygen sensor in fluid communication with the cathode outlet of said fuel cell stack and the inlet of the wet side of said humidifier, said oxygen sensor adapted to generate a sensor signal indicative of a concentration of the oxygen in the fluid exiting said fuel cell stack, wherein the sensor signal is used to determine a system diagnostic.

18. A fuel cell system comprising:
a fuel cell stack including at least a cathode inlet and at least a cathode outlet, wherein a fluid comprising oxygen is caused to flow through the inlet and the outlet of said fuel cell stack;
a humidifier having a dry side with an outlet and an inlet and a wet side with an inlet adapted to humidify the fluid, the outlet of the dry side of said humidifier in fluid communication with the cathode inlet of said fuel cell stack;
a compressor in fluid communication with the inlet of the dry side of said humidifier, wherein said compressor to provide a flow of the fluid to maintain a desired stoichiometry at the inlet of said fuel cell stack; and
an oxygen sensor in fluid communication with the cathode outlet of said fuel cell stack and the inlet of the wet side of said humidifier, said oxygen sensor adapted to generate a sensor signal indicative of a concentration of the oxygen in the fluid exiting said fuel cell stack, wherein the sensor signal is used to determine whether a leak of the fluid exists from a dry side of said humidifier to a wet side of said humidifier.

* * * * *